United States Patent
Banerjee et al.

(10) Patent No.: US 7,483,376 B2
(45) Date of Patent: Jan. 27, 2009

(54) METHOD AND APPARATUS FOR DISCOVERING PATH MAXIMUM TRANSMISSION UNIT (PMTU)

(75) Inventors: Dwip N. Banerjee, Austin, TX (US);
Deanna Lynn Quigg Brown, Pflugerville, TX (US); Ketan P. Pancholi, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 10/870,541

(22) Filed: Jun. 17, 2004

(65) Prior Publication Data

US 2005/0281288 A1    Dec. 22, 2005

(51) Int. Cl.
*G08C 15/00* (2006.01)
*H04L 12/56* (2006.01)
*H04J 3/22* (2006.01)

(52) U.S. Cl. .................. 370/235; 370/389; 370/466

(58) Field of Classification Search ................ 370/229, 370/230, 230.1, 231, 232, 233, 235, 236, 370/236.1, 236.2, 351, 395.21, 464, 465, 370/468, 470, 472, 389, 466
See application file for complete search history.

(56) References Cited

U.S. PATENT DOCUMENTS

| | | | |
|---|---|---|---|
| 5,751,970 A | 5/1998 | Bournas | 395/200.66 |
| 5,892,753 A | 4/1999 | Badt et al. | 370/233 |
| 5,959,974 A | 9/1999 | Badt et al. | 370/233 |
| 6,212,190 B1 * | 4/2001 | Mulligan | 370/400 |
| 7,236,501 B1 * | 6/2007 | Lim et al. | 370/470 |
| 2002/0141448 A1 * | 10/2002 | Matsunaga | 370/469 |
| 2003/0188015 A1 * | 10/2003 | Lee et al. | 709/238 |
| 2004/0008664 A1 * | 1/2004 | Takahashi et al. | 370/351 |
| 2004/0071140 A1 * | 4/2004 | Jason et al. | 370/392 |

(Continued)

FOREIGN PATENT DOCUMENTS

CN    1425996    6/2003

(Continued)

OTHER PUBLICATIONS

Jain, et al.; *Method, System and Article for Router-Assisted Fast Processing of Packet Termination in Hosts*, U.S. Appl. No. 10/703,013, Nov. 6, 2003, 26 pages.

(Continued)

*Primary Examiner*—Seema S Rao
*Assistant Examiner*—Christine Duong
(74) *Attorney, Agent, or Firm*—Williams, Morgan & Amerson, P.C.

(57) ABSTRACT

The present invention provides a method and apparatus for discovering a path maximum transmission unit. The method comprises receiving a data packet from a first remote device for transmission to a second remote device and determining if a size of the received data packet is greater than a maximum transmission unit (MTU) value. In response to determining that the size of the received data packet is greater than the MTU value, the method further comprises transmitting a portion of the received data packet to the second remote device and transmitting a message to the first remote device indicating that the size of the received data packet exceeds the MTU value.

9 Claims, 7 Drawing Sheets

U.S. PATENT DOCUMENTS

2004/0088383 A1* 5/2004 Dillon .................. 709/219

FOREIGN PATENT DOCUMENTS

CN 1426204 6/2003

OTHER PUBLICATIONS

Brown, et al., *System and Method of Reducing Data Corruption Due to Recycled IP Identification Numbers*, U.S. Appl. No. 10/631,064, Jul. 31, 2003, 33 pages.

Brown, et al., *Apparatus and Method of Reducing Dataflow Disruption when Detecting Path Maximum Transmission Unit(PMTU)*, U.S. Appl. No. 10/112,498, Mar. 28, 2002, 29 pages.

Thomson Delphion Bulletin, IBM Technical Disclosure Bulletin, vol. 38, *Packet Fragmentation by Interface Hardware*, Jan. 1995, 1 page.

J. Mogul, et al., Request for Comments No. 1191, *Path MTU Discovery*, Nov. 1990, 17 pages.

* cited by examiner

METHOD AND APPARATUS FOR DISCOVERING PATH MAXIMUM TRANSMISSION UNIT (PMTU)

BACKGROUND OF THE INVENTION

1. Field of the Invention

The invention generally relates to network communications, and, in particular, to discovering the path maximum transmission unit (PMTU) of a network connection.

2. Description of the Related Art

It is generally accepted that for efficient data transfer using an Internet Protocol (IP) connection, the data packet size should be as large as possible. The larger the packets, the lesser the overhead associated with transferring the entire data. However, if a packet is larger than what any given intermediate router along the communication path can process, the packet will be fragmented at that link. The maximum size packet that a router can process without fragmenting the packet is called a maximum transmission unit (MTU). The maximum size packet that can be transferred from a transmitting host to a receiving host without fragmentation is called path maximum transmission unit (PMTU). Consequently, the PMTU is a function of the maximum size packets that all intermediate routes in an IP connection can process without fragmenting the packets.

For efficient transmission, it is desirable to determine the PMTU for a given IP connection. One method of determining the PMTU is described in Request for Comments (RFC) 1191. RFC 1191 describes a procedure in which the transmitting host sends a discovery packet with an instruction that the packet not be fragmented (e.g., the "don't fragment" bit is set). If there is some MTU between the two communicating devices that is too small to pass the packet successfully, then the discovery packet is dropped and a "can't fragment" message is sent back to the transmitting source. For example, if a router along the transmission path has a lower MTU than the size of the discovery packet, the router drops the received packet and thereafter transmits a "can't fragment" message to the transmitting source. In some instances, the router may provide its MTU size to the transmitting source. The "can't fragment" message is sent using Internet Control Message Protocol (ICMP), which is an extension to IP and is used to support packets containing errors, control, and informational messages.

Upon receiving the "can't fragment" message, the transmitting source then knows to decrease the size of the packets. As such, the transmitting source retransmits the discovery packet using a new, lower MTU value. If the network path between the transmitting source and the receiving device includes several routers (or other network devices) with lower MTU values, then the discovery mechanism of RFC 1191 will require many iterations to discover an acceptable MTU. For example, assume that two routers exist between the transmitting host and the receiving host, and that the first router has an MTU value of 4392 bytes and the second router has an MTU value of 1500 bytes. Further, assume that the transmitting source sends a discovery packet of 9000 bytes (with the "can't fragment" indication set) intended for the receiving host. The discovery packet first arrives at the first router, which, upon determining that the packet size exceeds its MTU value, will discard the packet and send a "can't fragment" ICMP message to the transmitting source. In some instances, the first router may also transmit its MTU to the transmitting source.

The transmitting source, upon receiving the "can't fragment" message, retransmits a lower-size discovery packet (such as the size of the MTU value of the first router, if available). This time the first router will allow the second discovery because its size is less than the MTU of the first router. However, this discovery packet will be rejected by the second router, which, in this example, has a MTU value of 1500 bytes. The second router will thus discard the received discovery packet and transmit a "can't fragment" message to the transmitting source. In some instances, the second router may also transmit its MTU to the transmitting host. Upon receiving the ICMP message, the transmitting host will retransmit another discovery packet of a size that is acceptable to the second router. Thus, in the above described example, the transmission source takes at least two (2) iterations to determine the PMTU. As the number of routers (or hops) increase in a given path, then so can the number of iterations needed to determine the PMTU. As a result, the efficiency of the network transmission can suffer, thereby adversely affecting network performance.

The present invention is directed to addressing, or at least reducing, the effects of, one or more of the problems set forth above.

SUMMARY OF THE INVENTION

In one aspect of the instant invention, a method is provided for discovering a path maximum transmission unit. The method comprises receiving a data packet from a first remote device for transmission to a second remote device and determining if a size of the received data packet is greater than a maximum transmission unit (MTU) value. In response to determining that the size of the received data packet is greater than the MTU value, the method further comprises transmitting a portion of the received data packet to the second remote device and transmitting a message to the first remote device indicating that the size of the received data packet exceeds the MTU value.

In another aspect of the instant invention, an apparatus is provided for discovering a path maximum transmission unit. An apparatus comprises an interface and a control unit communicatively coupled to the interface. The control unit is adapted to receive a data packet through the interface from a first remote device for transmission to a second remote device and determine if a size of the received data packet is greater than a maximum transmission unit (MTU) value. In response to determining that the size of the received data packet is greater than the MTU value, the control unit is further adapted to transmit a portion of the received data packet to the second remote device and transmit a message to the first remote device indicating that the size of the received data packet exceeds the MTU value.

In yet another aspect of the instant invention, an article comprising one or more machine-readable storage media containing instructions is provided for discovering a path maximum transmission unit. The instructions, when executed, enable a processor to receive a data packet from a first remote device for transmission to a second remote device and determine if a size of the received data packet is greater than a maximum transmission unit (MTU) value. In response to determining that the size of the received data packet is greater than the MTU value, the processor is further enabled to transmit a portion of the received data packet to the second remote device and transmit a message to the first remote device indicating that the size of the received data packet exceeds the MTU value.

BRIEF DESCRIPTION OF THE DRAWINGS

The invention may be understood by reference to the following description taken in conjunction with the accompanying drawings, in which like reference numerals identify like elements.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
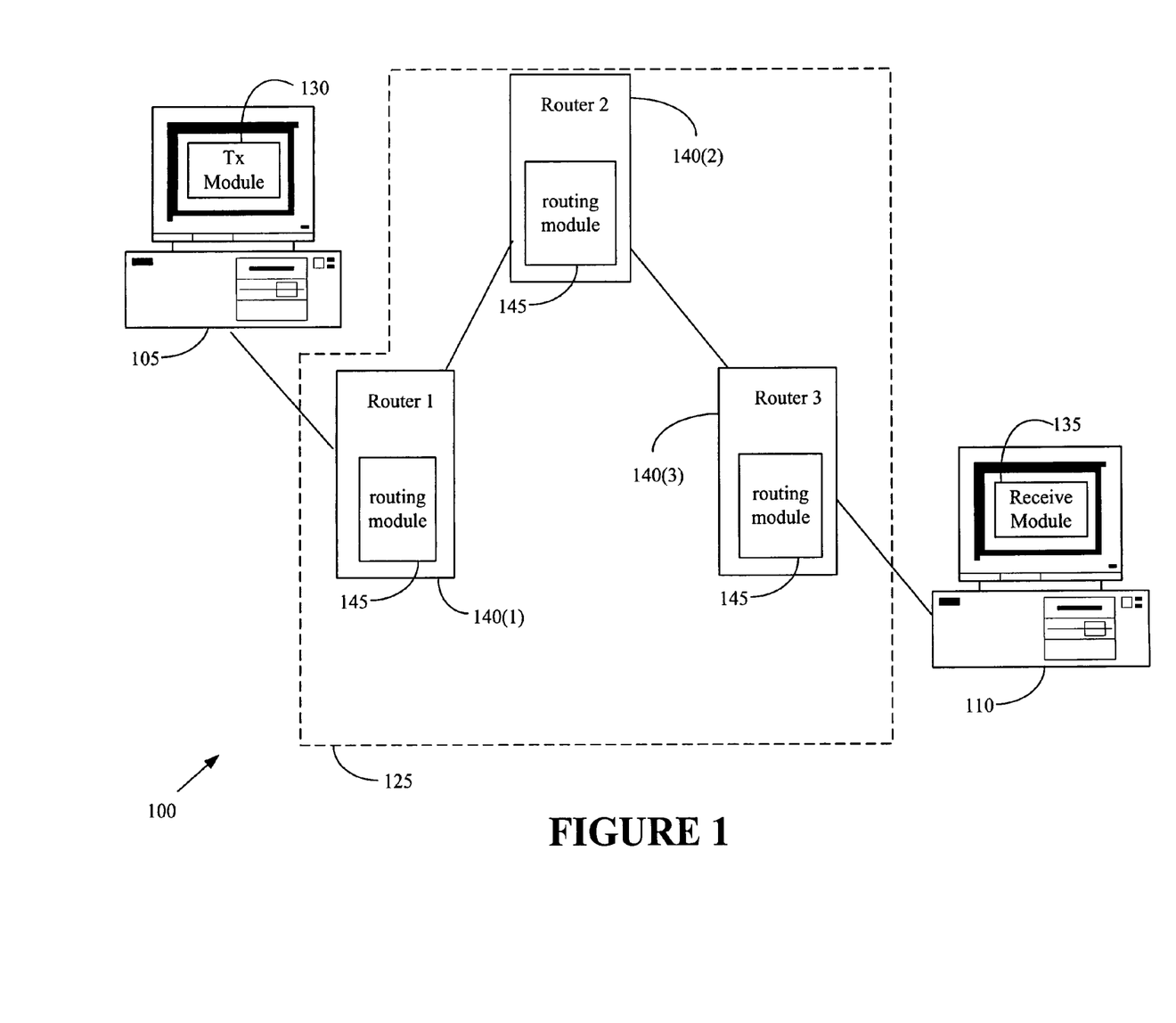
FIG. 1 is a block diagram of an embodiment of a communications system, in accordance with the present invention.

Referring to FIG. 1, a communications system 100 is illustrated in accordance with one embodiment of the present invention. The communications system 100 includes a first processor-based host 105 that is communicatively coupled to a second processor-based host 110 by a network 125, such as by a private network or a public network (e.g., the Internet). In the illustrated embodiment, the first host 105 includes a transmit module 130 (Tx module) for transmitting one or more data packets, and the second host 110 includes a receiving module 135 (Rx module) for receiving the transmitted packets. For illustrative purposes, the host devices 105, 110 are depicted in FIG. 1 to include the respective transmitting module 130 and receiving module 135, although it should be appreciated that in an alternative embodiment, the host devices 105, 110 may each include both modules 130, 135, and thus each may be capable of both transmitting and receiving packets at desired times.

The network 125 may include one or more network devices 140(1-3) (labeled "routers" in the illustrated embodiment) through which the host devices 105, 110 may communicate. The network devices 140(1-3) may, in one embodiment, may be network gateways, network switches, or other devices capable of forwarding received data packets to the intended destination. The number of routers 140(1-3) employed in a given network 125 may vary from one implementation to another. For illustrative purposes, it is herein assumed that the packets sent by the transmitting module 130 traverse through the first router 140(1), the second router 140(2), the third router 140(3) (in that order) before arriving at the receiving module 135. Generally, each router 140 has its own associated MTU threshold (the maximum size packet that the router can process without fragmenting the packet).

The routers 140(1-3), in the illustrated embodiment, include a routing module 145 that processes discovery packets sent by the transmitting module 130 in accordance with one embodiment of the present invention. A discovery packet is a data packet that includes a flag indicating that the data packet should not be fragmented. Generally, and as described in greater detail below, the routing module 145 of a given router 140, upon receiving a discovery packet, forwards at least a portion of the received discovery packet to the next hop (e.g., the next router) even though the router 140 determines that the size of the received discovery packet is greater than the MTU supported by that router 140. As explained below, by transmitting at least portion of the received packet, the routing module 145 allows the transmitting module 130 of the host 105 to determine the path MTU in an efficient manner.

It should be appreciated that the arrangement of the communications system 100 of FIG. 1 is exemplary in nature and that, in alternative embodiments, the network 125 may include any desirable number of routers 140. The hosts 105, 110 may each be any suitable type of processor-based device, such as a desktop computer, laptop computer, a mainframe, a portable device, a kiosk, a Web appliance, and the like.

The various modules 130, 135, and 145, illustrated in FIG. 1 are implemented in software, although in other implementations these modules may also be implemented in hardware or a combination of hardware and software. In one embodiment, each module 130, 135, and 145, may comprise a plurality of modules, with each of the plurality of modules capable of performing one or more desired acts.

The network 125 of FIG. 1 may be a packet-switched data network, such as a data network according to the Internet Protocol/Transport Control Protocol (TCP/IP). Examples of the network 125 may include local area networks (LANs), wide area networks (WANs), intranets, and the Internet. One version of IP is described in Request for Comments (RFC) 791, entitled "Internet Protocol," dated September 1981, and a version of TCP is described in RFC 793, entitled "Transmission Control Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 125 may also include other types of packet-based data networks in further embodiments. Examples of such other packet-based data networks include Asynchronous Transfer Mode (ATM), Frame Relay networks and the like.

Figure 2:
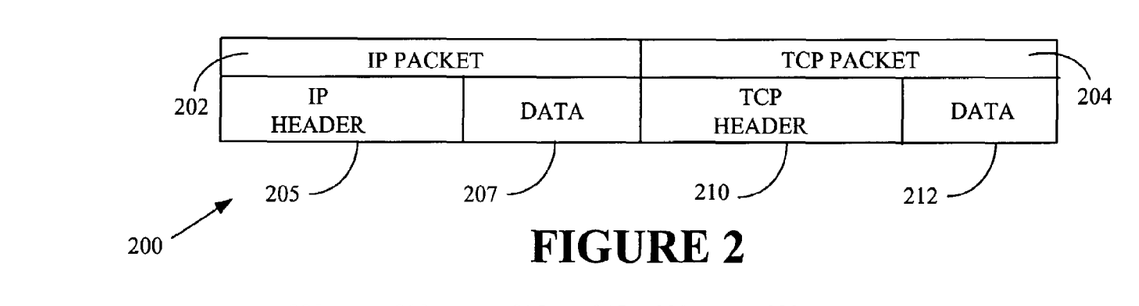
FIG. 2 illustrates a TCP/IP data packet that may be employed in the communications system of 1, in accordance with one embodiment of the present invention.

The communications system 100 employs the TCP/IP protocol, although other protocols may also be employed in alternative embodiments. For a proper perspective, a representative TCP/IP data packet 200 is shown in FIG. 2. The data packet includes an IP packet 202 and a TCP packet 204. The IP packet 202 includes an IP header 205 and IP data portion 207 (contains payload), and the TCP packet 204 includes a TCP header 210 and a TCP data portion 212 (contains payload). One embodiment of the IP header 205 is shown in FIG. 3, and one embodiment of the TCP header 205 is shown in FIG. 4.

Figure 3:
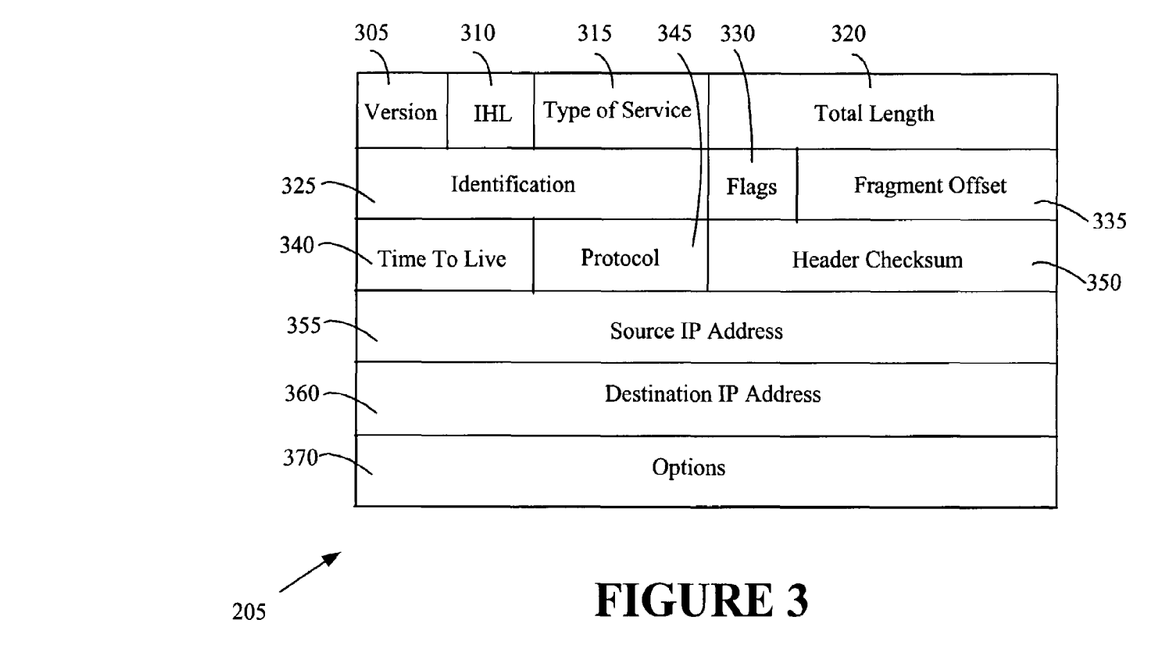
FIG. 3 depicts an IP header of the TCP/IP data packet of FIG. 2.

FIG. 3 depicts various fields of the IP header 205 of the illustrated embodiment. The IP header 205 includes a version field 305 that indicates the version of IP associated with the data packet 202 (see FIG. 2). An IP header length (IHL) field 310 indicates the length of the header. A type-of-service field 315 specifies how a current data packet should be handled by an upper-layer protocol. Each data packet can be assigned a level of importance. A total length field 320 specifies the length of the entire IP packet 202, including the header 205 and the data portion 207. An identification field 325 contains an integer that identifies the current data packet. This field is used to help piece together data packet fragments. A flag field 330, which in the illustrated embodiment is a 3-bit field, is used for fragmentation and re-assembly. The low-order (first) bit is called "more fragments" (MF) bit, and is used to indicate the last fragment of a packet so that the receiver knows that the packet can be re-assembled. The second bit is the "do not fragment" (DF) bit, which suppresses fragmentation. The third or high-order bit is not used.

The IP header 205 includes a fragment offset field 335 that indicates the position of the fragment's data relative to the beginning of the data in the original data packet, which allows the destination IP process to properly reconstruct the original data packet. A time-to-live field 340 maintains a counter that gradually decrements down to zero, at which point the data packet is discarded. This keeps packets from looping endlessly. A protocol field 345 indicates which upper-layer protocol receives incoming packets after IP processing is complete. A header checksum field 350 aids in ensuring the integrity of the IP header 205. The IP header 205 includes a source IP address field 355 that specifies a sending node (e.g., host 105), and a destination IP address field 360 that specifies a receiving node (e.g., host 110). An options field 370 allows IP to support various options, such as security.

Figure 4:
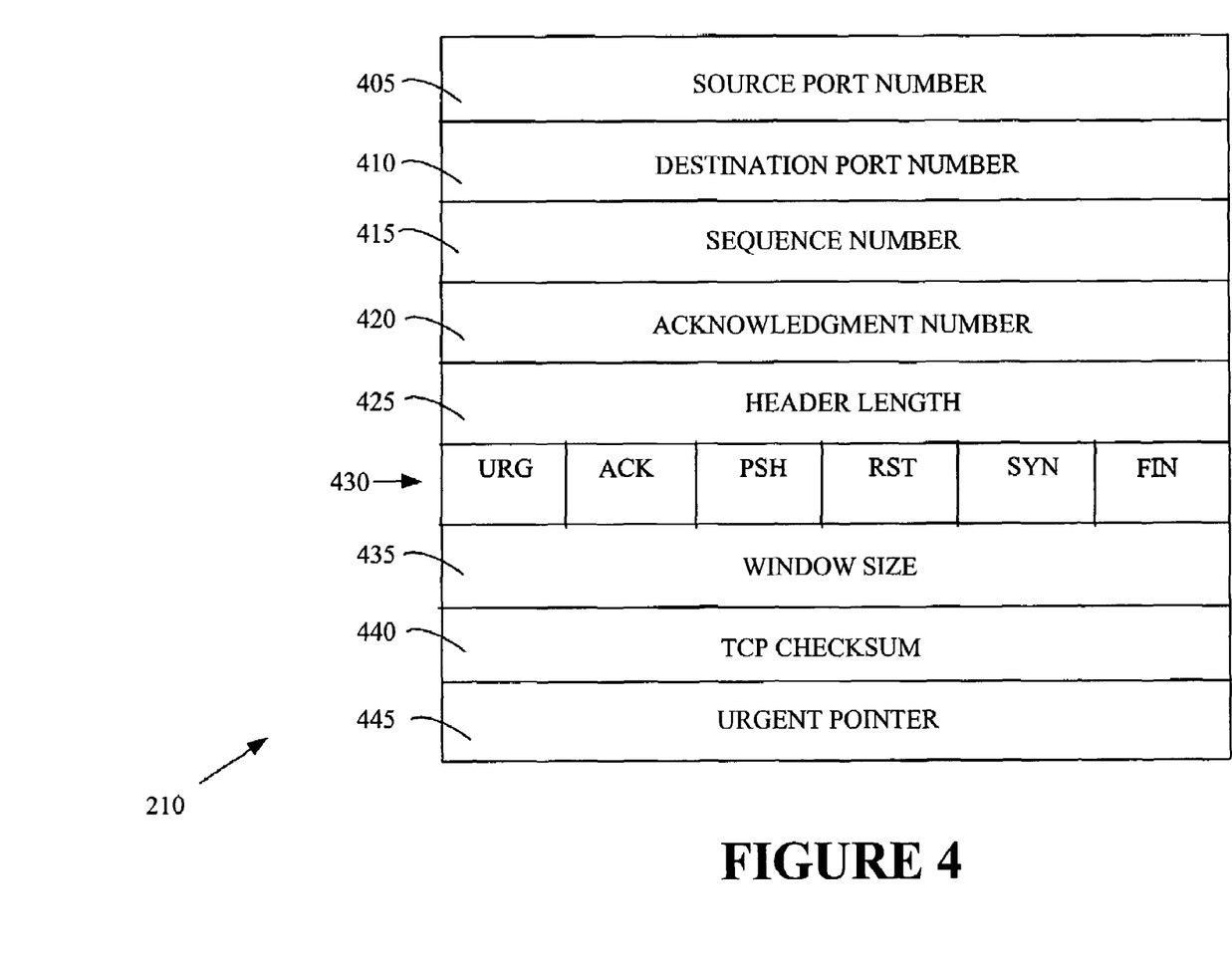
FIG. 4 illustrates a TCP header of the TCP/IP data packet of FIG. 2.

FIG. 4 depicts the TCP header 210 of FIG. 2. A source port number field 405 and a destination port number field 410 are employed to keep track of different conversations. For example, if a server is communicating with three different clients, the server uses a particular port number to communicate with each one of the clients. Thus, the values stored in the source port number field 405 and destination port number field 410 in conjunction with the IP address and the IP header 205 identify a unique connection. This unique connection is often referred to as a socket.

The TCP header 210 includes a sequence number field 415 that is employed to inform the receiving host 110 of a particular packet in the stream of packets. This sequence number field 415 is also employed by the receiving host 110 to notify the sending host 105 that all data packets up to a certain number have been received. The TCP header 210 includes an acknowledgement number field 420 that contains the sequence number of the next byte of data the sender of the packet expects to receive. A header length field 425 indicates the size of the TCP header 210.

The TCP header 210 includes a plurality of flag fields 430 for carrying a variety of control information, including the SYN and ACK flags used for connection establishment, the FIN flag used for connection termination, URG field to indicate that the urgent pointer field 445 (discussed below) has valid information, the PSH flag to instruct the receiving host 110 to pass the data received thus far immediately to a higher-level application, and the RST flag to inform the receiving host 110 to re-establish connection.

The TCP header 210 includes a window-size field 435 that specifies the size of the sender's receive window (that is, the buffer space available for incoming data). A TCP checksum field 440 ensures that the TCP header 210 (and the associated data) have not been modified (or corrupted) in transmit. If the checksum is invalid, the receiving host 110 will not acknowledge the message. The urgent pointer field 445 points to the end of the data field that is considered urgent and requires immediate attention. This field is not valid if the URG flag is not set.

The transmitting module 130 of the host 105 of FIG. 1 may periodically perform a PMTU discovery. The discovery may include transmitting a packet that has a maximum size of the lesser of the local MTU or the maximum segment size (MSS) assigned by the remote system, such as the receiving host 110. The discovery packets are sent with the DF bit set (see Flags field 330 of FIG. 3). If there is some MTU between the two host devices 105, 110 that is less than the size of the transmitted packet, then a "can't fragment" message is sent back to the source (in this case the transmitting host 105). The transmitting host 105 thus knows to decrease the size of the packets.

Figure 5:
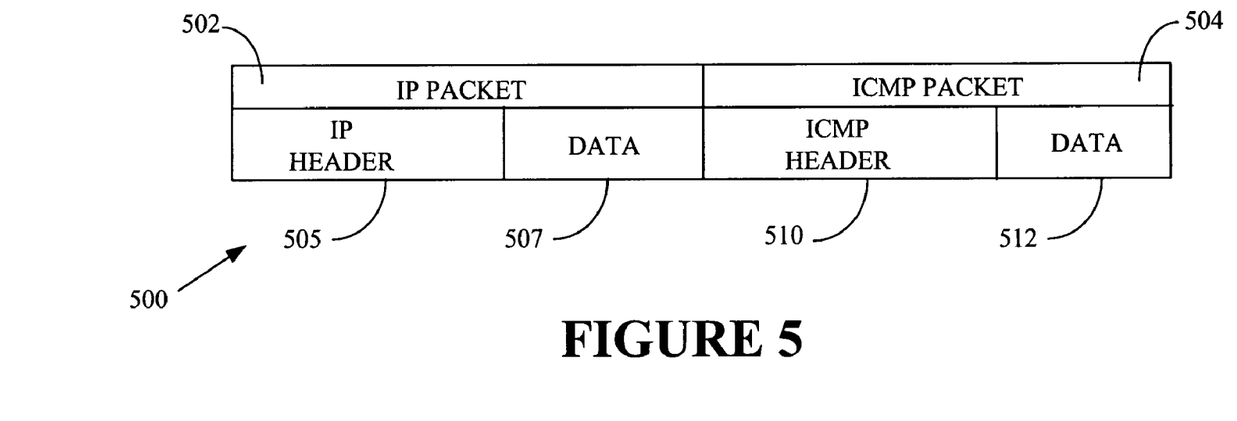
FIG. 5 depicts an ICMP data packet.

The "can't fragment" message, in the illustrated embodiment, is sent using the Internet control message protocol (ICMP), which is an extension to IP and is utilized to support packet containing errors, control, and informational messages. FIG. 5 illustrates a representative IP/ICMP data packet 500. The ICMP data packet 500 includes an IP packet 502 and an ICMP packet 504. The IP packet 502 includes an IP header 505, and an associated data portion 507 and the ICMP packet 502 includes an ICMP header 510 and an associated data portion 512.

Figure 6:
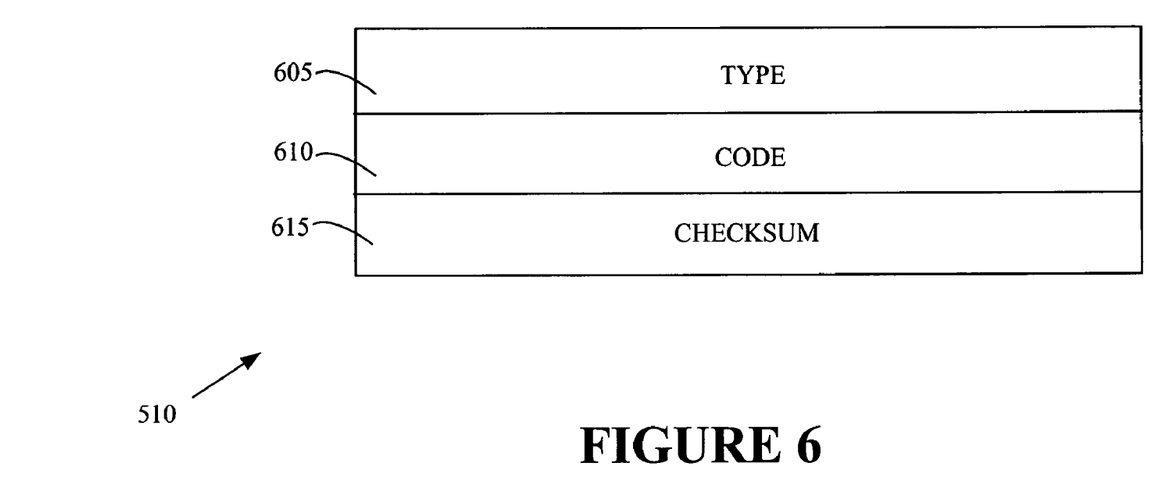
FIG. 6 illustrates an ICMP header of the ICMP data packet of FIG. 5.

FIG. 6 illustrates a format of the ICMP header 510 of the ICMP data packet 500 that may be transmitted by the routing module 145 of the routers 140(1-3) (see FIG. 1). The header 510 includes a "type" field 605, which can have a value from zero (0) to 256, representing a kind of classification for grouping a "class" of communication types together. A code field 610 specifies various types of messages that fit into the classification of the types defined in the type field 605. For example, a value of three (3) in the type field 605 indicates that the destination of the discovery packet is unreachable, and a value of four (4) in the code field 610 indicates that fragmentation is needed but the "do not fragment" flag is set. When a type 3, code 4 ICMP 504 packet is received by the transmitting host 105, it indicates to the transmitting host 105 that the discovery packet was dropped by the router 140 that sent the ICMP packet 500. A checksum field 615 allows the remote device (e.g., host 105) to verify the integrity of an incoming ICMP data packet 504. The ICMP packet 504 is loaded with a predefined number in the checksum field 615, and then when the checksum is computed, the checksum is written over the previous value.

Figure 7:
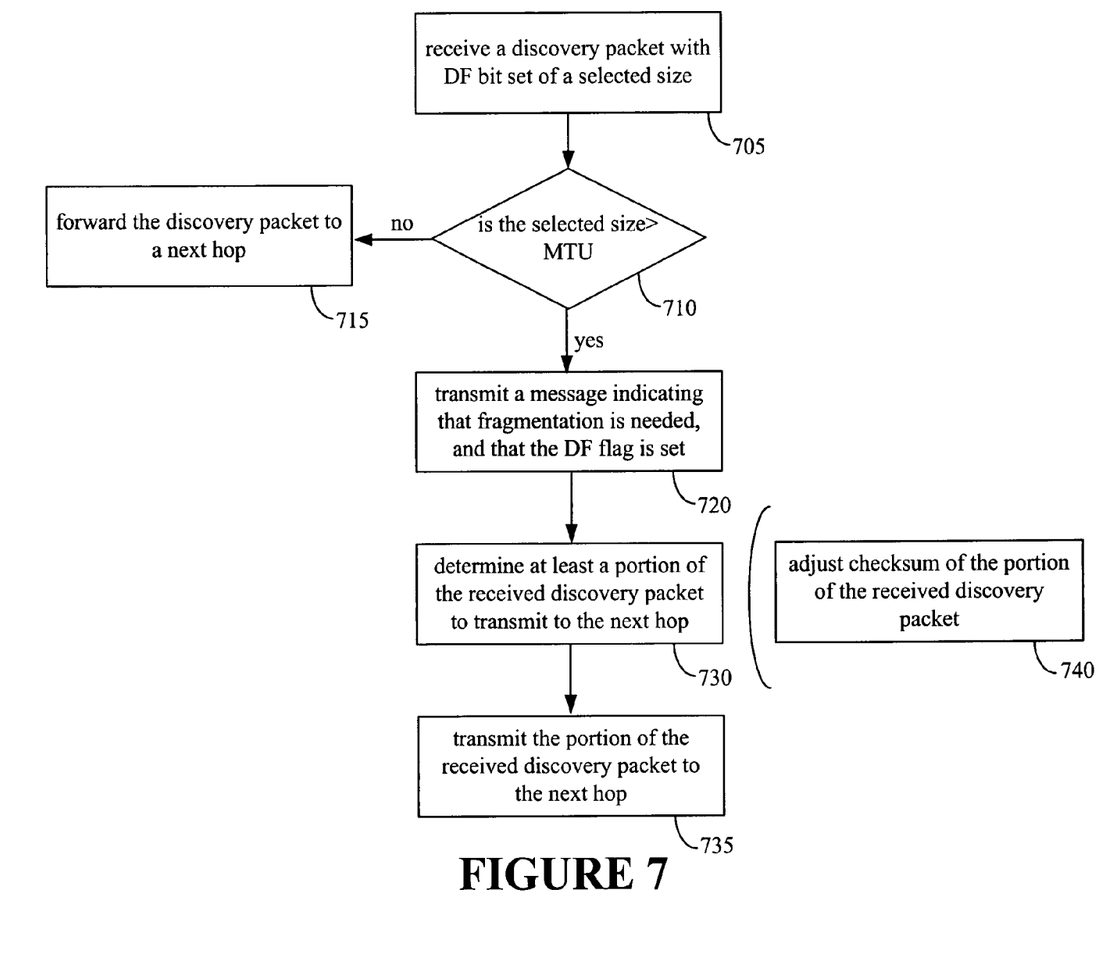
FIG. 7 illustrates a flow diagram of a routing module that may be implemented in the communications system of FIG. 1, in accordance with one embodiment of the present invention.

A flow diagram of one embodiment of the routing module 145 of FIG. 1 is illustrated in FIG. 7, in accordance with the present invention. As described below, the routing module 145 allows the transmitting host 105 to determine a path MTU in an efficient manner. For illustrative purposes, it is herein assumed that the transmitting host 105 transmits a discovery data packet (with the DF flag set) of a selected size (9000 bytes) that is intended for the receiving host 110. For ease of illustration, it is also herein assumed that the path between transmitting host 105 and the receiving host 110 includes the first, second, and third routers 140(1-3), each having an MTU of 4392, 1500, and 1006 bytes, respectively. Of course, the MTU sizes supported by the routers 140(1-3) or other network devices may vary from one implementation to another, and it should be appreciated that the exemplary values utilized herein are for illustrative purposes only.

The routing module 145 of the first router 140(1) receives (at 705) the discovery packet transmitted by the host 105. In one embodiment, the discovery packet may take the form of the TCP/IP data packet 200 shown in FIG. 2. The routing module 145 determines (at 710) if the size of the discovery packet is greater than the MTU supported by the first router 140(1). If the discovery data packet is not greater than the MTU (an indication that the received packet can be handled by the first router 140(1) without fragmentation), the routing module 145 forwards the discovery packet to a next hop. The next hop in the illustrated example is the second router 140(2), the next router in the path. In other embodiments, the next hop may be any neighboring network device (including a network gateway, switch, router, or even the ultimate destination device, such as the receiving host 110).

If the routing module 145 determines (at 710) that the size of the received discovery packet is greater than the MTU of the first router 140(1), the routing module 145 transmits (at 720) a message to the transmitting source (transmitting host 105, in this example) indicating that fragment is needed and that the "don't fragment" bit is set. In the illustrated embodiment, the message transmitted (at 720) is a "can't fragment" message that is sent in accordance with the ICMP protocol discussed above. Thus, the ICMP data packet 500 of FIG. 5 is employed to transmit the message (at 720). In one embodiment, the routing module 145 may also transmit (at 720) the MTU value of the first router 140(1) to indicate to the transmitting host 105 the maximum data packet size that is supported by the first router 140(1).

The routing module 145 of the first router 140(1) determines (at 730) at least a portion of the received discovery packet to be transmitted to the next hop, which in the illustrated example is the second router 140(2). The determined portion of the received discovery packet is transmitted (at 735) by the routing module 145 of the first router 140(1) to the next hop. In one embodiment, the portion of the data transmitted (at 735) by the routing module 145 is transmitted with the "don't fragment" flag set. That is, the routing module 145 of the first router 140(1) transmits (at 735) at least a portion of the received data packet (with the DF flag still set in the flag field 330 of FIG. 3) to the next hop. The size of the "portion" transmitted (at 735) by routing module 145 may be any packet size that is less than or equal to the MTU size supported by the first router 140(1). The remaining portion (i.e., the un-transmitted portion) of the discovery packet may then be discarded by the routing module 145. Thus, in accordance with one embodiment of the present invention, the routing module 145, instead of dropping the received over-sized packet, transmits at least a portion of the packet to the next hop while discarding the remaining portion.

As noted above, in this example, the packet size transmitted by the host 105 is 9000 bytes, and the MTU of the first router 140(1) is 4392 bytes. Because the size of the packet is greater than the MTU of the first router 140(1) in this example, the routing module 145 transmits a portion of the 9000 bytes of the received packet to the next hop. Assuming that routing module 145 transmits the maximum data size that is supported by the first router 140(1) in this embodiment, the routing module 145 transmits 4392 bytes of the received data packet and discards the remaining bytes. The higher order bytes of the data packet may be transmitted, for example. In other embodiments, the "portion" of the data to be transmitted may be selected in other suitable ways without deviating from the spirit and scope of the present invention.

Each subsequent router 140 that includes the routing module 145 (e.g., the second and third routers 140(2-3) in this example) can thereafter perform the process illustrated in FIG. 7. Thus, with respect to the second router 140(2), the routing module 145 receives (at 705) the portion of the discovery packet (e.g., 4392 bytes) that is transmitted (at 735) by the first router 140(1). Like the first router 140(1), the second router 140(2) may transmit (at 735) a portion of the received data packet and discard the rest if it is determined (at 710) that the size of the received data packet is greater than the MTU of the second router 140(2). In this example, because the first router 140(1) transmits 4392 bytes of the original 9000 bytes and because the second router 140(2) has a MTU of 1500 bytes, the routing module 145 of the second router 140(2) transmits a portion of the 4392 bytes of the received packet to the next hop (e.g., the third router 140(3)). Assuming that the second router 140(2) transmits the maximum data size that is supported, the routing module 145 transmits (at 735) 1500 bytes of the 4392 bytes of the received data packet, and discards the remaining bytes. The transmitted portion is sent with the DF flag set. Along with discarding a portion of the received data packet, the routing module 145 also transmits (at 720) a message to the transmitting host 105 indicating that the received packet size exceeds its MTU value. The routing module 145 of the second router 140(2), in one embodiment, may provide its MTU value to the transmitting host 105.

The third router 140(3) similarly processes the packet that is transmitted (at 735) by the second router 140(2) according to the process of FIG. 7. In the context of the specific example discussed, because the second router 140(2) transmits 1500 bytes and because the third router 140(3) has a MTU of 1006 bytes, the routing module 145 of the router 140(3) transmits a portion of the 1500 bytes of the received packet to the next hop, which in this case is the receiving host 110. Assuming that the second router 140(2) transmits the maximum data size that is supported, the routing module 145 transmits (at 735) 1006 bytes of the 1500 bytes of the received data packet, and discards the remaining bytes. The transmitted portion is sent with the DF flag set. Along with discarding a portion of the received data packet, the routing module 145 of the third router 140(3) also transmits (at 720) a message to the transmitting host 105 indicating that the received packet size exceeds its MTU value. The routing module 145 of the third router 140(3), in one embodiment, may also provide its MTU value to the transmitting host 105.

The truncated discovery packets that are forwarded or transmitted (at 735) by the routers 140(1-3) may result in checksum errors at the receiving end (the receiving host 110). For example, data received by the receiving host 110 in the truncated discovery packet will fail to correspond to the checksum value originally calculated by the transmitting host 105. As such, the receiving module 135 of the host 110 may discard the received truncated discovery packet. To reduce the likelihood of this, in one embodiment, the routing module 145 of the routers 140(1-3) may adjust the checksum (at 740—see FIG. 7) of the truncated packet before transmitting it to the next hop. Thus, in one embodiment, the routing module 145 may adjust the checksum (at 740) each time the received discovery packet needs truncation before the truncated packet is forwarded to the next hop. The re-calculated checksum may, for example, be stored in the checksum field 440 of FIG. 4 before the discovery packet is transmitted (at 735) to the next hop. The checksum stored in the checksum field 350 (see FIG. 3) of the IP packet 202 may also be updated. It should be appreciated that, in one embodiment, the routing module 145 may transmit (at 735) a portion of the received discovery packets without adjusting (at 740) the checksum.

In the context of the above-presented example, where a packet of 1006 bytes reaches the receiving host 110 because of the MTU size of the third router 140(3), each router 140 along the transmission path adjusts the checksum of the truncated packet accordingly such that the 1006 bytes arriving at the receiving host 110 has the correct checksum value. Upon receiving the discovery packet (of 1006 bytes), the receiving host 110 transmits an acknowledgement (in the field 430 of FIG. 4) to the transmitting host 105 indicating that the packet arrived correctly with 1006 bytes. The transmitting host 105, upon receiving the acknowledgement, can ascertain that at least a portion of the data was transmitted successfully to the receiving host 110, and can thus transmit the remaining portion (the non-acknowledged portion) of the data. In this embodiment, the transmitting host 105 is able to successfully convey at least a portion of the data carried in the discovery packet while using that discovery packet to also determine the path MTU. Furthermore, based on the acknowledgment transmitted by the receiving host 110, the transmitting host 105 may be able to determine information relating to roundtrip time of the connection between two communicating host devices 105, 110. In one embodiment, the transmitting module 130 of the host 105 may include a delay to allow the acknowledgement from the receiving host 110 to arrive, thereby reducing the possibility of re-transmitting the portion of the data that is successfully received by the receiving host 110.

By transmitting at least a portion of the received packet to the next hop (as opposed to discarding it altogether), the routing module 145 allows the transmit host 105 to more efficiently determine the path MTU. This is, because at least a portion of the discovery packet that is initially transmitted by the transmit host 105 may be forwarded through the network path even though one or more of the intermediate MTUs is less than the size of the discovery packet. In one embodiment, a "can't fragment" ICMP message is sent each time an intermediate MTU is less than the incoming discovery packet. Furthermore, the ICMP message may include information about the values of each intermediate MTUs that is less than the incoming discovery packet. In this manner, the transmitting host 105 is able to ascertain information about the intermediate MTUs by transmitting fewer discovery packets in comparison to the conventional discovery mechanism. That is, fewer iterations are needed to discover the PMTU using the present invention.

In one embodiment, the present invention allows the transmitting host 105 to efficiently determine the path MTU without requiring modification to either the transmitting host 105 or the receiving host 110. That is, the path discovery process may be improved by implementing the process described in FIG. 7 in one or more of the routers 140(1-3). Moreover, in one embodiment, the present invention may be implemented in the network 125 that has both conventional routers (routers that discard the received discovery packet if its size exceeds the local MTU) and routers 140(1-3) that have the routing module 145 stored therein. In such a scenario, while the conventional routers may discard the incoming discovery packet (if its size is larger than the MTU of the router), there may be some benefit derived by the routers 140(1-3) of the present invention that forward at least some portion of the incoming discovery packet even when the size of the incoming packet may exceed the MTU of that router 140.

Figure 8:
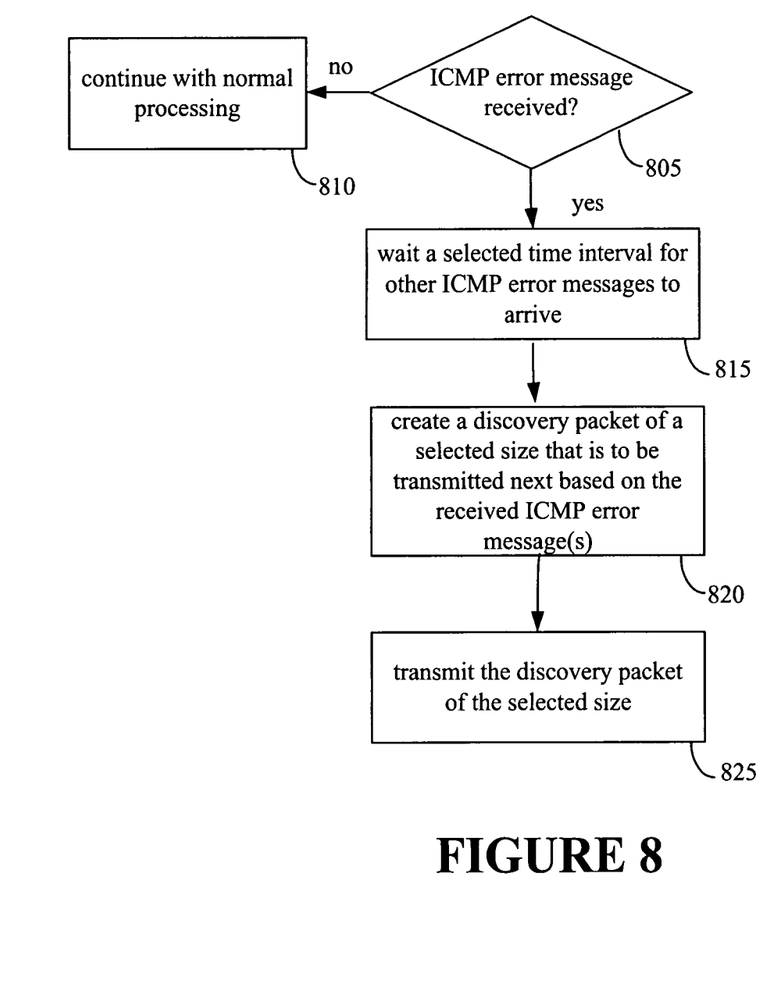
FIG. 8 illustrates a flow diagram of a transmitting module that may be implemented in the communications system of FIG. 1, in accordance with one embodiment of the present invention.

FIG. 8 illustrates a flow diagram of one aspect of the transmitting module 130 of the host 105, in accordance with one embodiment of the present invention. The transmitting module 130 determines (at 805) if an ICMP error message (e.g., "can't fragment" message) is received. The ICMP error message, for example, may be transmitted by each router 140 that has a MTU value smaller than the size of the discovery packet received by that router 140, where the discovery packet has its DF flag set. If no ICMP error message is determined (at 805), the routing module 145 continues normal processing (at 810), such as transmitting and receiving data packets. If, however, an ICMP error message is detected (805), the transmitting module 130 waits (at 815) a selected time interval for other ICMP error messages, if any, to arrive. The "selected" delay time interval may be chosen to be any desired value to allow ICMP error messages that may have been transmitted by the various routers 140(1-3) to reach the transmitting host 105 as the discovery packet(s) propagate through the network 125. The selected delay thus allows the transmitting module 130 additional time to identify routers 140(1-3) that may not be able to handle the transmitted discovery packet(s). In cases where the routers 140(1-3) provide their own MTU values in response to transmitting a "can't fragment" message, the selected delay also allows the transmitting module 130 to determine the various MTU sizes of these routers 140(1-3).

The transmitting module 130 creates (at 820) a discovery packet that is to be transmitted next of a selected size based on any received ICMP error message(s). For example, if a first router 140 provides its MTU value in the ICMP error message (or in some other message), the transmitting module 130 may create (at 820) the next discovery packet such that its size substantially corresponds to the size represented by the MTU value. As another example, if more than one router 140 responds with its MTU value, the transmitting module 130 may create (at 820) the next discovery packet such that its size substantially corresponds to the size of the smallest MTU value received. This would allow the discovery packet to at least successfully traverse through the router 140 that has the smallest then-known MTU. The transmitting module 130 transmits (at 825) the discovery packet of the selected size to the receiving host 110.

In one embodiment, the amount of time the transmitting module 130 waits (at 815) may be zero (i.e., no delay). That is, in this embodiment, the transmitting module 130 may create (at 820) and transmit (825) a discovery packet each time an ICMP error message is detected (at 805). One advantage of this embodiment is that conventional transmitting hosts may be employed with the routers 140 of communications system 100 of FIG. 1 that include the routing module 145.

Figure 9:
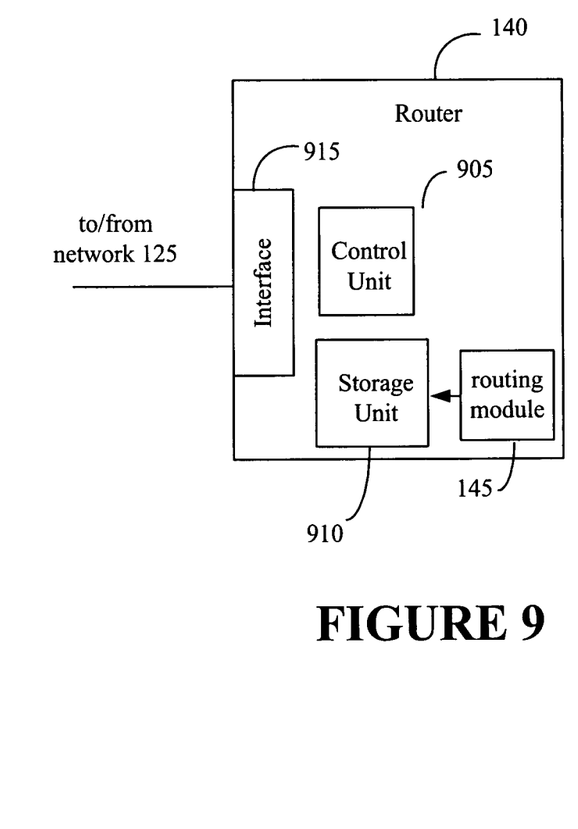
FIG. 9 depicts a block diagram of a router that may be employed in the communications system of FIG. 1, in accordance with one embodiment of the present invention.

Referring now to FIG. 9, a stylized block diagram of a router 140 that may be implemented in the communications system of FIG. 1 is illustrated, in accordance with one embodiment of the present invention. The router 140 includes a control unit 905 that is communicatively coupled to a storage unit 910, which has the routing module 145 stored therein. The control unit 905 performs overall functions for the router 140, including executing one or more module(s) stored in the storage unit 910. The router 140 includes an interface 915 that is communicatively coupled to the control unit 905. The control unit 905 communicates with other devices coupled to the network 125 via the interface 905.

Figure 10:
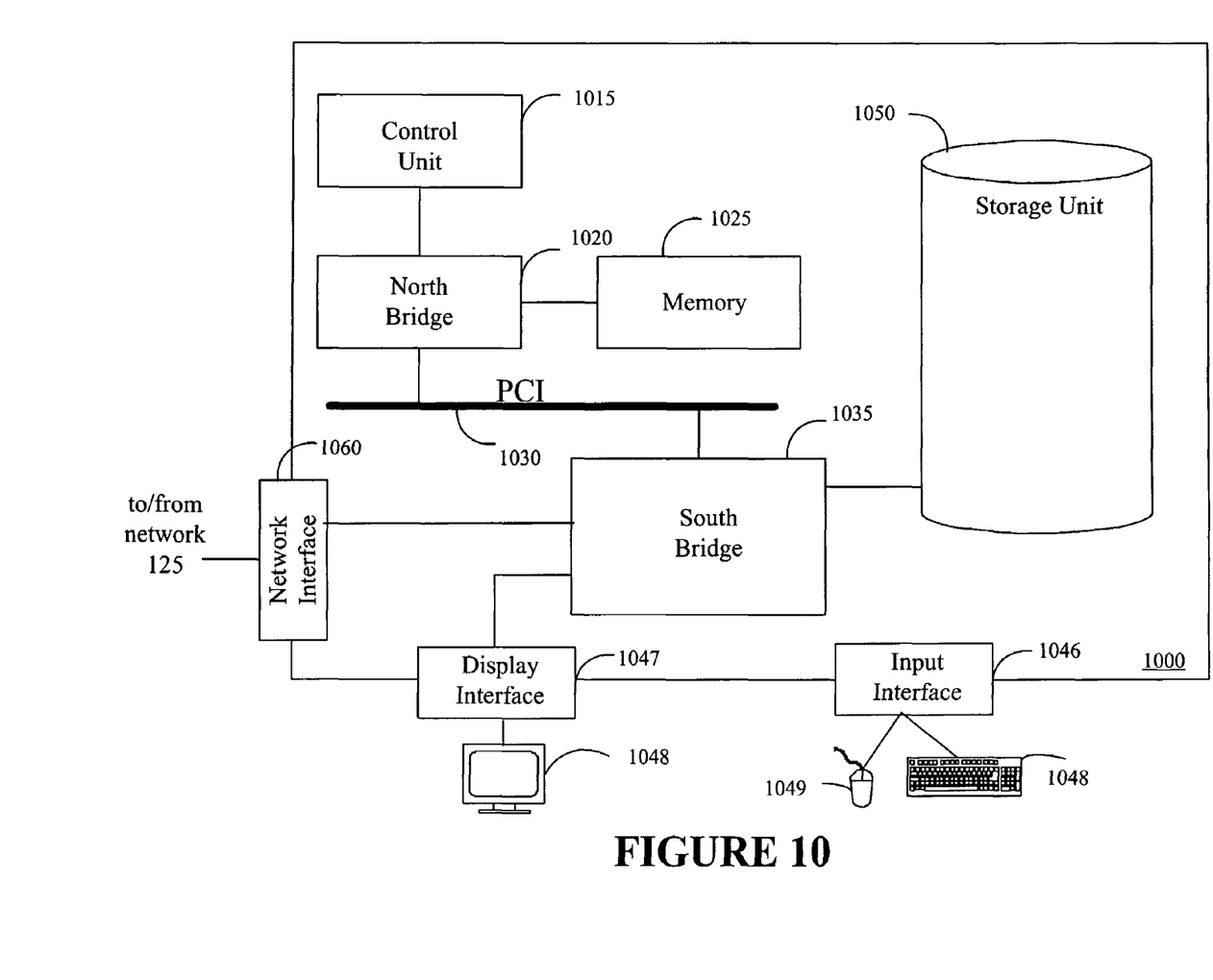
FIG. 10 illustrates a block diagram of a transmitting host and a receiving host that may be employed in the communications system of FIG. 1, in accordance with one embodiment of the present invention.

Referring now to FIG. 10, a stylized block diagram of a processor-based device 1000 that may be implemented in the communications system of FIG. 1 is illustrated, in accordance with one embodiment of the present invention. That is, the processor-based device 1000 may represent one embodiment of the transmitting host 105 or the receiving host 110. The processor-based device 1000 comprises a control unit 1015, which in one embodiment may be a processor that is capable of interfacing with a north bridge 1020. The north bridge 1020 provides memory management functions for a memory 1025, as well as serves as a bridge to a peripheral component interconnect (PCI) bus 1030. In the illustrated embodiment, the processor-based device 1000 includes a south bridge 1035 coupled to the PCI bus 1030.

A storage unit 1050 is coupled to the south bridge 1035. Although not shown, it should be appreciated that in one embodiment an operating system, such as AIX, Windows®, Disk Operating System®, Unix®, OS/2®, Linux®, MAC OS®, or the like, may be stored on the storage unit 1050 and executable by the control unit 1015. The storage unit 1050 may also include device drivers (not shown) for the various hardware components of the system 1000.

In the illustrated embodiment, the processor-based device 1000 includes a display interface 1047 that is coupled to the south bridge 1035. The processor-based device 1000 may display information on a display device 1048 via the display interface 1047. The south bridge 1035 of the processor-based device 1000 may include a controller (not shown) to allow a user to input information using an input device, such as a keyboard 1048 and/or a mouse 1049, through an input interface 1046.

The south bridge 1035 of the system 1000, in the illustrated embodiment, is coupled to a network interface 1060, which may be adapted to receive, for example, a local area network card. In an alternative embodiment, the network interface 1060 may be a Universal Serial Bus interface or an interface for wireless communications. The processor-based device 1000 communicates with other devices coupled to the network through the network interface 1060.

It should be appreciated that the configuration of the processor-based device 1000 of FIG. 10 is exemplary in nature and that, in other embodiments the processor-based device 1000 may include fewer, additional, or different components without deviating from the spirit and scope of the present invention. For example, in an alternative embodiment, the processor-based device 1000 may not include a north bridge 1020 or a south bridge 1035, or may include only one of the two bridges 1020, 1035, or may combine the functionality of the two bridges 1020, 1035. As another example, in one embodiment, the processor-based device 1000 may include more than one control unit 1015. Similarly, other configurations may be employed consistent with the spirit and scope of the present invention.

The various system layers, routines, or modules may be executable control units (such as control unit 905, 1015 (see FIGS. 9 and 10)). The control unit 905, 1015 may include a microprocessor, a microcontroller, a digital signal processor, a processor card (including one or more microprocessors or controllers), or other control or computing devices. The storage devices 910, 1050 referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices 910, 1050. The instructions when executed by a respective control unit 905, 1015 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:

receiving a first IP data packet encapsulating a second data packet from a first remote device for transmission to a second remote device, wherein the encapsulated second data packet comprises at least a header portion containing header information and a data portion containing data, and wherein the received first IP data packet includes a "don't fragment" flag;

determining if a size of the received first IP data packet is greater than a maximum transmission unit (MTU) value; and in response to determining that the size of the received first IP data packet is greater than the MTU value, transmitting a portion of the data within the data portion of the received encapsulated second data packet to the second remote device and transmitting a message to the first remote device indicating that the size of the received first IP data packet exceeds the MTU value, wherein transmitting a portion of the data within the data portion of the received encapsulated second data packet and transmitting the message to the first remote device are done in response to determining that the "don't fragment" flag is set.

2. The method of claim 1, wherein the act of receiving comprises receiving the first IP data packet from a transmitting host for transmission to a receiving host.

3. The method of claim 1, wherein receiving the encapsulated second data packet includes receiving a first transmission control protocol (TCP) data packet in the data portion of the first IP data packet;

further comprising, in response to determining the size of the received first IP data packet is greater than the MTU value, forming a second TCP data packet with a portion of the data within the data portion of the received encapsulated second data packet, wherein forming the second TCP data packet comprises determining a checksum value of the second TCP data packet;

further comprising, forming a second IP packet that encapsulates the second TCP data packet, wherein the size of the second IP packet is less than the MTU value; and wherein transmitting the portion of the data within the data portion of the received encapsulated second data packet further comprises:

transmitting, in the second IP packet, the portion of the data that contains the higher order bytes of the data portion of the received encapsulated second data packet to the second remote device; and transmitting the checksum value of the second TCP data packet to the second remote device;

wherein transmitting the message to the first remote device further comprises:

generating the message that is used by the first remote device as a starting reference for determining a selected time interval after which a portion of data within the encapsulated second data packet is re-transmitted by the first remote device; and providing, in the message, information about at least one intermediate MTU value that is less than the size of the received first IP packet, wherein the message is included in an Internet Control Message Protocol (ICMP) packet.

4. The method of claim 1, further comprising transmitting to the first remote device the MTU value.

5. The method of claim 1, wherein transmitting the portion of the data within the data portion of the received encapsulated second data packet comprises transmitting a second IP data packet of a size that substantially corresponds to the MTU value, and wherein transmitting the portion of the data within the data portion of the received encapsulated second data packet comprises transmitting the portion of the data within the data portion of the received encapsulated second data packet within a transmission control protocol (TCP) data packet.

6. The method of claim 1, further comprising determining a checksum value of a second IP data packet that is transmitted to the second remote device and transmitting the checksum value of the second IP data packet to the second remote device.

7. The method of claim 1, wherein transmitting the portion of the data within the data portion of the received encapsulated second data packet comprises setting a "don't fragment" flag associated with a data payload portion of the received first IP data packet before transmitting the portion of the received data within the encapsulated second data packet to the second remote device.

8. The method of claim 1, further comprising receiving, using the first remote device, the message indicating that the size of the received first IP data packet exceeds the MTU value, waiting for a selected time interval, and transmitting, using the first remote device, a portion of data within the data portion of the received encapsulated second data packet in a second IP data packet of a selected size in response to waiting for the selected time interval.

9. The method of claim 8, wherein the message contains the MTU value, and wherein transmitting the second IP data packet of the selected size comprises transmitting the second IP data packet of a size that substantially corresponds to the MTU value.

\* \* \* \* \*